US012712195B2

(12) United States Patent
Cao et al.

(10) Patent No.: US 12,712,195 B2
(45) Date of Patent: Aug. 18, 2026

(54) ADHESIVE APPLYING APPARATUS, ADHESIVE APPLYING METHOD, AND BATTERY PROCESSING DEVICE

(71) Applicant: Contemporary Amperex Technology (Hong Kong) Limited, Hong Kong (CN)

(72) Inventors: Wei Cao, Ningde (CN); Jian Luo, Ningde (CN); Jianrong Huang, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 154 days.

(21) Appl. No.: 18/419,193

(22) Filed: Jan. 22, 2024

(65) Prior Publication Data

US 2024/0429424 A1 Dec. 26, 2024

Related U.S. Application Data

(63) Continuation of application No. PCT/CN2023/101773, filed on Jun. 21, 2023.

(51) Int. Cl.
*H01M 10/04* (2006.01)

(52) U.S. Cl.
CPC ................................ *H01M 10/0404* (2013.01)

(58) Field of Classification Search
CPC . H01M 10/0404; C09J 2203/33; Y02E 60/10; Y02P 70/50; B29C 65/7802; B29C 2063/0008; B32B 2041/04; B32B 38/1833; B32B 38/1841
USPC .......................................... 156/64, 378, 379
See application file for complete search history.

(56) References Cited

FOREIGN PATENT DOCUMENTS

| | | | |
|---|---|---|---|
| CN | 209626350 U | * | 11/2019 |
| CN | 112875404 A | | 6/2021 |
| CN | 213692116 U | * | 7/2021 |
| CN | 215771243 U | | 2/2022 |
| CN | 114700225 A | | 7/2022 |
| CN | 114824418 A | | 7/2022 |

(Continued)

OTHER PUBLICATIONS

Machine translation of CN 215771243 date unknown.*

(Continued)

*Primary Examiner* — John L Goff, II

(74) *Attorney, Agent, or Firm* — Anova Law Group, PLLC

(57) ABSTRACT

The present application relates to an adhesive applying apparatus, an adhesive applying method and a battery processing device. The adhesive applying apparatus includes a workbench, an adhesive applying mechanism, a detection assembly, and a visual compensation module. The detection assembly can detect to obtain current positions of a battery cell and adhesive paper respectively. The visual compensation module can obtain a total deviation value based on a deviation value between the current position of the battery cell and its target position and a deviation value between the current position of the adhesive paper and its target position, and then correct an adhesive applying position of the adhesive applying mechanism based on the total deviation value, so that the adhesive applying mechanism can apply adhesive on the battery cell at the corrected adhesive applying position, thereby effectively improving precision of adhesive applying for the battery cell.

14 Claims, 3 Drawing Sheets

(56) References Cited

FOREIGN PATENT DOCUMENTS

| | | |
|---|---|---|
| CN | 216958129 U | 7/2022 |
| CN | 112875404 B | 5/2023 |

OTHER PUBLICATIONS

Machine translation of CN 114824418 date unknown.*
Machine translation of CN 209626350 date unknown.*
Machine translation of CN 213692116 date unknown.*
The European Patent Office (EPO) The Extended European Search Report for Application No. 23833563.2 Feb. 6, 2025 9 Pages.
The World Intellectual Property Organization (WIPO) International Search Report and Written Opinion for PCT/CN2023/101773 Dec. 25, 2023 13 Pages (including translation).

* cited by examiner

ADHESIVE APPLYING APPARATUS, ADHESIVE APPLYING METHOD, AND BATTERY PROCESSING DEVICE

CROSS-REFERENCE TO RELATED APPLICATION

This application is a continuation of International Application No. PCT/CN2023/101773, filed on Jun. 21, 2023, the entire content of which is incorporated herein by reference.

TECHNICAL FIELD

The present application relates to the technical field of batteries, and in particular to an adhesive applying apparatus, an adhesive applying method, and a battery processing device.

BACKGROUND

During processing of a battery, it is necessary to apply adhesive to battery cells, and then fix two or more battery cells with adhesive paper, so that a plurality of battery cells can be stacked in a thickness direction of the battery cells, and then assembled to form a battery module or directly assembled to form a battery.

However, the current adhesive applying process usually uses a mechanical positioning method, which makes precision of applying the adhesive paper on the battery cells lower, affects assembly precision of the battery cells, and accordingly affects structural precision of the finally assembled battery module or battery.

SUMMARY OF THE INVENTION

In view of this, the present application provides an adhesive applying apparatus, an adhesive applying method, and a battery processing device.

In a first aspect, the present application provides an adhesive applying apparatus, including:

- a workbench, including a first accommodating station for holding a battery cell;
- an adhesive applying mechanism, configured to apply adhesive paper on the battery cell;
- a detection assembly, arranged on the workbench and configured to detect a current position of the battery cell in the first accommodating station and a current position of the adhesive paper on the adhesive applying mechanism; and a visual compensation module, connected in communication with the adhesive applying mechanism and the detection assembly respectively, the visual compensation module being configured to obtain a total deviation value based on a deviation value between the current position of the battery cell and its target position and a deviation value between the current position of the adhesive paper and its target position, to correct an adhesive applying position of the adhesive applying mechanism.

In a technical solution of embodiments of the present application, the detection assembly can detect to obtain current positions of a battery cell and adhesive paper respectively; the visual compensation module can obtain a total deviation value based on a deviation value between the current position of the battery cell and its target position and a deviation value between the current position of the adhesive paper and its target position, and then correct an adhesive applying position of the adhesive applying mechanism based on the total deviation value, so that the adhesive applying mechanism can apply adhesive on the battery cell at the corrected adhesive applying position. It is obtained through practice that precision of adhesive applying of the traditional adhesive applying method is usually less than or equal to 1.5 mm, and after correction is performed by means of visual compensation described above, the precision of adhesive applying can be increased to less than or equal to 0.8 mm, and accordingly the precision of adhesive applying for the battery cell is effectively improved.

In some embodiments, the detection assembly includes a first detection member and a second detection member respectively connected in communication with the visual compensation module, the first detection member is configured to detect a first current position of the battery cell in the first accommodating station, the second detection member is configured to detect a second current position of the adhesive paper on the adhesive applying mechanism; and the target position of the battery cell in the first accommodating station is defined as a first target position, and the target position of the adhesive paper on the adhesive applying mechanism is defined as a second target position;

- where the visual compensation module is configured to compare the first current position with the first target position to obtain a first deviation value, and is further configured to compare the second current position with the second target position to obtain a second deviation value, and to obtain the total deviation value based on the first deviation value and the second deviation value.

In a technical solution of the embodiments of the present application, the first detection member and the second detection member detect and position the battery cell and the adhesive paper respectively, so that current positions of the battery cell and the adhesive paper can be quickly obtained; and after comparison is performed by means of the visual compensation module, the total deviation value between the battery cell and the adhesive paper can be obtained quickly and accurately. Therefore, accurate visual compensation can be carried out for an adhesive applying process based on the total deviation value, thereby improving the precision of adhesive applying effectively.

In some embodiments, the adhesive applying apparatus further includes a positioning platform and a positioning member arranged on the workbench, the positioning platform has a second accommodating station for accommodating the adhesive paper, and the positioning member is configured to initially position the adhesive paper in the second accommodating station.

In a technical solution of the embodiments of the present application, the adhesive paper is initially positioned in the second accommodating station by the positioning platform and the positioning member, so that the position of the adhesive paper on the adhesive applying mechanism is more accurate after the adhesive applying mechanism picks the adhesive paper from the second accommodating station, thus reducing the second deviation value between the second current position of the adhesive paper and the second target position on the adhesive applying mechanism, and facilitating the high-precision positioning based adhesive applying between the battery cell and the adhesive paper by means of visual compensation.

In some embodiments, the adhesive applying mechanism is movably arranged between the second accommodating station and the first accommodating station, and the adhesive applying mechanism is configured to be capable of picking the adhesive paper from the second accommodating station and to apply the adhesive paper on the battery cell.

In a technical solution of the embodiments of the present application, the adhesive applying mechanism is movably arranged between the second accommodating station and the first accommodating station, so that the adhesive paper can be smoothly moved from the second accommodating station to the first accommodating station for adhesive applying.

In some embodiments, the adhesive applying mechanism includes a moving member and an adhesive picking member arranged on the moving member, the adhesive picking member is configured to pick or release the adhesive paper, and the moving member is movably arranged on the workbench and configured to drive the adhesive picking member to move between the second accommodating station and the first accommodating station.

In a technical solution of the embodiments of the present application, the moving member can smoothly drive the adhesive picking member and the adhesive paper thereon to move between the second accommodating station and the first accommodating station. The adhesive picking member can pick or release the adhesive paper smoothly to realize smooth applying of the adhesive paper finally.

In some embodiments, the adhesive applying mechanism further includes an adjusting member connected between the moving member and the adhesive picking member, and the adjusting member is configured to adjust a distance between the adhesive picking member and the moving member.

In a technical solution of the embodiments of the present application, the adjusting member can flexibly adjust the distance between the adhesive picking member and the moving member based on different specifications of battery cells to be applied with adhesive paper during adhesive applying, so that the adhesive picking member can stably apply the adhesive paper to the battery cells more smoothly, thereby improving stability in adhesive applying.

In some embodiments, the adhesive applying apparatus further includes a feed bin and a loading mechanism, the feed bin is arranged on at least one side of the workbench, and the loading mechanism is arranged between the feed bin and the workbench and configured to move the adhesive paper in the feed bin to the workbench.

In a technical solution of the embodiments of the present application, with the arrangement of the feed bin and the loading mechanism, it is possible to realize feeding of the adhesive paper and smoothly move the adhesive paper to the workbench so as to facilitate the adhesive applying operation. Thus, the adhesive applying efficiency can be improved.

In some embodiments, the adhesive applying mechanism further includes a tearing member, the tearing member being configured to tear off release paper on the adhesive paper;

where the tearing member is arranged on the workbench; or the tearing member is arranged on the adhesive applying mechanism; or the tearing member is arranged on both the workbench and the adhesive applying mechanism.

In a technical solution of the embodiments of the present application, the adhesive paper can be smoothly adhered on the battery cell by means of the tearing member.

In some embodiments, the detection assembly further includes a third detection member arranged on the workbench, and the third detection member is configured to detect the state of the release paper on the adhesive paper.

In a technical solution of the embodiments of the present application, after the release paper on the adhesive paper is torn off by the tearing member, the third detection member can take a picture of the adhesive paper, so as to detect whether or not the release paper on the adhesive paper has been cleanly torn off, helping the adhesive paper to be more firmly adhered on the battery cell.

In a second aspect, the present application provides a battery processing device, including an adhesive applying apparatus described above, the adhesive applying apparatus being configured to apply adhesive paper on the largest side of a battery cell.

In a third aspect, the present application provides an adhesive applying method, including the following steps:

- detecting and obtaining a current position of a battery cell in a first accommodating station on a workbench;
- detecting and obtaining a current position of adhesive paper on an adhesive applying mechanism;
- obtaining a total deviation value based on a deviation value between the current position of the battery cell and its target position and a deviation value between the current position of the adhesive paper and its target position, to correct an adhesive applying position of the adhesive applying mechanism; and
- controlling the adhesive applying mechanism to apply adhesive on the battery cell at the adhesive applying position.

In some embodiments, the step of obtaining a total deviation value based on a deviation value between the current position of the battery cell and its target position and a deviation value between the current position of the adhesive paper and its target position, to correct an adhesive applying position of the adhesive applying mechanism further includes steps of:

- presetting a first target position and a second target position, where the first target position is a target position of the battery cell in the first accommodating station and the second target position is a target position of the adhesive paper on the adhesive applying mechanism;
- comparing a first current position with the first target position to obtain a first deviation value;
- comparing a second current position with the second target position to obtain a second deviation value; and
- obtaining the total deviation value based on the first deviation value and the second deviation value.

In some embodiments, before the step of detecting and obtaining a current position of adhesive paper on an adhesive applying mechanism, the method further includes steps of:

- initially positioning the adhesive paper in a second accommodating station on a positioning platform; and
- controlling the adhesive applying mechanism to pick the adhesive paper from the second accommodating station.

In some embodiments, before the step of placing the adhesive paper on the positioning platform, the method further includes steps of:

- controlling a loading mechanism to pick the adhesive paper from a feed bin;
- tearing off release paper on a side of the adhesive paper facing away from the loading mechanism; and
- detecting whether the release paper on the adhesive paper is cleanly torn off.

In some embodiments, after the step of controlling the adhesive applying mechanism to apply adhesive on the battery cell at the adhesive applying position, the method further includes a step of:

- tearing off release paper on a side of the adhesive paper facing away from the battery cell.

The above description is only a summary of the technical solutions of the present application. In order to be able to understand the technical means of the present application more clearly, the technical means can be implemented according to the content of the specification. Furthermore, to make the above and other objectives, features and advantages of the present application more comprehensible, specific implementations of the present application are exemplified below.

DESCRIPTION OF DRAWINGS

Various other advantages and benefits will become apparent to those of ordinary skill in the art upon reading the following detailed description of the embodiments. The drawings are for the purpose of illustrating the embodiments only and are not to be considered a limitation to the present application. In addition, the like components are denoted by the like reference numerals throughout the drawings. In the drawings.

Figure 1:
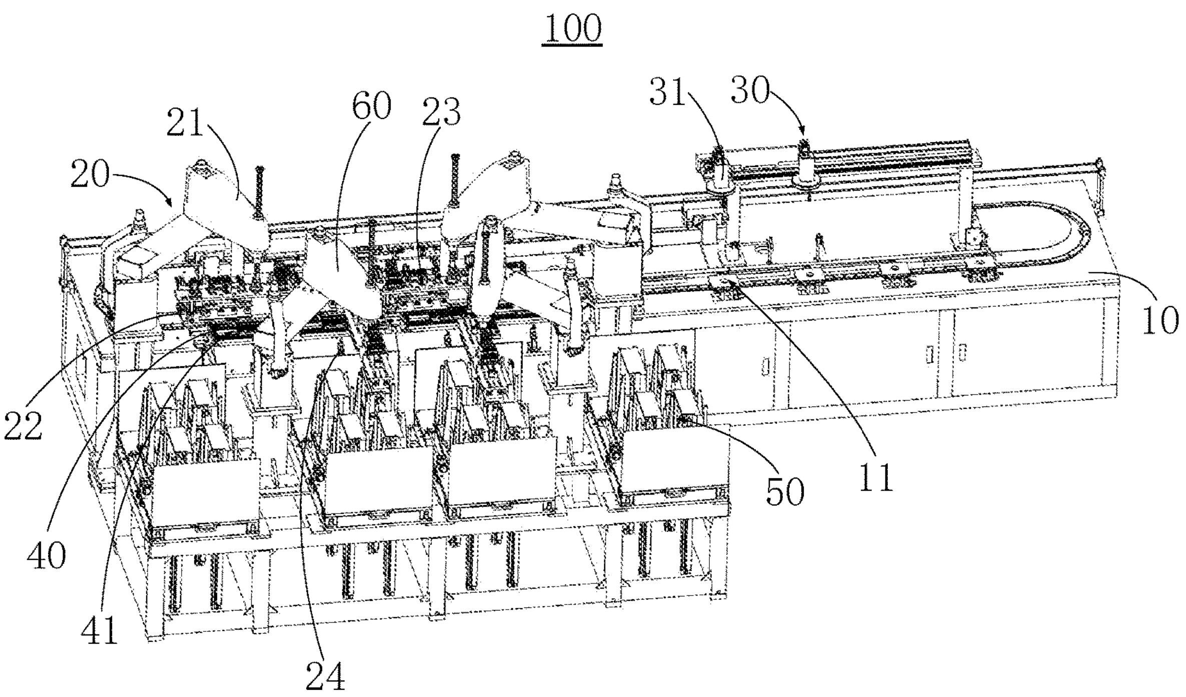
FIG. 1 is a schematic diagram of the overall structure of an adhesive applying apparatus according to one or more embodiments.

100, adhesive applying apparatus; 10, workbench; 20, adhesive applying mechanism; 30, detection assembly; 40, positioning platform; 50, feed bin; 60, loading mechanism; 11, first accommodating station; 21, moving member; 22, adhesive picking member; 23, adjusting member; 24, tearing member; 31, first detection member; 32, second detection member; 33, third detection member; 41, second accommodating station.

DETAILED DESCRIPTION

Embodiments of the technical solutions of the present application will be described in detail below in conjunction with the drawings. The following embodiments are only used to more clearly illustrate the technical solutions of the present application, and therefore are only used as examples and cannot be used to limit the scope of protection of the present application.

Unless otherwise defined, all technical and scientific terms used herein have the same meaning as commonly understood by those skilled in the art belonging to the technical field of the present application; the terms used herein are intended only for the purpose of describing specific embodiments and are not intended to limit the present application; the terms "including" and "having" and any variations thereof in the Specification and the Claims of the present application and in the description of drawings above are intended to cover non-exclusive inclusion.

In the description of the embodiments of the present application, the technical terms "first", "second", and the like are used only to distinguish between different objects, and are not to be understood as indicating or implying a relative importance or implicitly specifying the number, particular order, or primary and secondary relation of the technical features indicated. In the description of the embodiments of the present application, the meaning of "a plurality of" is two or more, unless otherwise explicitly and specifically defined.

Reference herein to "an embodiment" means that a particular feature, structure, or characteristic described in connection with the embodiment can be included in at least one embodiment of the present application. The appearance of this phrase in various places in the specification does not necessarily refer to the same embodiment, nor is it a separate or alternative embodiment that is mutually exclusive with other embodiments. It is explicitly and implicitly understood by those skilled in the art that the embodiments described herein may be combined with other embodiments.

In the description of the embodiments of the present application, the term "and/or" is only an association relationship for describing associated objects, indicating that there may be three relationships, for example A and/or B may represent three situations: A exists alone, both A and B exist, and B exists alone. In addition, the character "/" herein generally represents that previous and next associated objects form an "or" relationship.

In the description of the embodiments of the present application, the term "a plurality of" refers to two or more (including two), and similarly, "multiple groups" refers to two or more (including two) groups, and "multiple sheets" refers to two or more (including two) sheets.

In the description of the embodiments of the present application, the orientation or position relationship indicated by the technical terms "center", "longitudinal", "transverse", "length", "width", "thickness", "upper," "lower," "front," "back," "left," "right," "vertical," "horizontal," "top," "bottom," "inner," "outer," "clockwise," "counterclockwise," "axial", "radial", "circumferential", etc. are based on the orientation or position relationship shown in the drawings and are intended to facilitate the description of the embodiments of the present application and simplify the description only, rather than indicating or implying that the device or element referred to must have a particular orientation or be constructed and operated in a particular orientation, and therefore are not to be interpreted as limitations on the embodiments of the present application.

In the description of the embodiments of the present application, unless otherwise expressly specified and limited, the technical terms "mount," "join," "connect," "fix," etc. should be understood in a broad sense, such as, a fixed connection, a detachable connection, or an integral connection; a mechanical connection, or an electrical connection; a direct connection, an indirect connection through an intermediate medium, an internal connection of two elements, or interaction between two elements. For those of ordinary skill in the art, the specific meanings of the above terms in the embodiments of the present application can be understood according to specific situations.

Currently, from a perspective of market development, application of power batteries is becoming more and more extensive. The power batteries are used in energy storage power source systems such as hydraulic, thermal, wind and solar power stations as well as in electric vehicles such as electric bicycles, electric motorcycles and electric cars, and other fields. With the continuous expansion of the application field of power batteries, the market demand is also constantly expanding.

A battery cell is the smallest unit that forms a battery, specifically, a plurality of battery cells may be connected in series or parallel or series-parallel to form a battery module, and then one or more battery modules are connected and assembled to form a battery. Of course, the plurality of battery cells may also be directly assembled to form a battery. Connection in series-parallel means that the plurality of battery cells are connected in both series and parallel.

In the process of forming a battery module or a battery from battery cells, it is usually necessary to apply adhesive on surfaces of the battery cells respectively, and then a plurality of battery cells are stacked along a thickness direction and are adhered and fixed by means of adhesive paper on surfaces of the adjacent battery cells.

In the above process, the precision of adhesive applying will affect the assembly precision of the battery cell, and even affect the structural precision of the finally assembled battery module or battery.

At present, when a battery cell is applied with adhesive, mechanical positioning is usually used. However, due to the problem of machining errors, it is not possible to ensure the consistency of the position of each procedure in an adhesive applying process, which ultimately limits the precision of adhesive applying and fails to improve the precision of adhesive applying.

Based on the above considerations, in order to solve the problem of low precision of adhesive applying in the adhesive applying process at present, an adhesive applying apparatus is provided in one or more embodiments of the present application, in which a battery cell and adhesive paper are positioned on a workbench and an adhesive applying mechanism, respectively. A detection assembly detects current positions of the battery cell and the adhesive paper; the visual compensation module can obtain a total deviation value based on a deviation value between the current position of the battery cell and its target position and a deviation value between the current position of the adhesive paper and its target position, and then correct an adhesive applying position of the adhesive applying mechanism based on the total deviation value, so that the adhesive applying mechanism can apply adhesive on the battery cell at the corrected adhesive applying position finally. As a result, mechanical errors between the adhesive paper and the battery cell or errors caused by other external factors can be compensated by means of visual compensation, thereby improving the precision of adhesive applying.

Referring to FIG. 1, according to one or more embodiments, provided is an adhesive applying apparatus 100 including a workbench 10, an adhesive applying mechanism 20, a detection assembly 30, and a visual compensation module (not shown in the figure). The workbench 10 is provided with a first accommodating station 11 for holding a battery cell. The adhesive applying mechanism 20 is configured to apply adhesive paper on the battery cell. The detection assembly 30 is arranged on the workbench 10 and configured to detect a current position of the battery cell in the first accommodating station 11 and a current position of the adhesive paper on the adhesive applying mechanism 20. The visual compensation module is connected in communication with the adhesive applying mechanism 20 and the detection assembly 30 respectively. The visual compensation module is configured to obtain a total deviation value based on a deviation value between the current position of the battery cell and its target position and a deviation value between the current position of the adhesive paper and its target position, to correct an adhesive applying position of the adhesive applying mechanism 20.

It is to be noted that the workbench 10 refers to a structure capable of providing a carrying and supporting base for the battery cell to facilitate the adhesive applying on the battery cell. The first accommodating station 11 refers to a position that can be used for placing of the battery cell and performing an adhesive applying operation to the battery cell. Herein, the first accommodating station 11 may be provided as one or as a plurality spaced apart from each other. When a plurality of first accommodating stations 11 are provided, each of the first accommodating station 11 can hold one battery cell. The battery cells on the different first accommodating stations 11 are then applied with adhesive respectively, so that the adhesive applying efficiency is improved.

The target position of the battery cell in the first accommodating station 11 refers to a theoretically preset adhesive applying position of the battery cell. However, in practice, due to the machining errors or other external factors, the actual position of the battery cell in the first accommodating station 11 is not the same as the target position, and the actual position here is a current position of the battery cell in the first accommodating station 11.

Similarly, the target position of the adhesive paper on the adhesive applying mechanism 20 refers to a theoretically preset position of the adhesive paper on the adhesive applying mechanism 20. However, in practice, due to the machining errors or other external factors, the actual position of the adhesive paper on the adhesive applying mechanism 20 is not the same as the target position, and the actual position here is a current position of the adhesive paper on the adhesive applying mechanism 20.

A certain deviation value is formed between the current position and the target position of the battery cell in the first accommodating station 11. A certain deviation value is also formed between the current position and the target position of the adhesive paper on the adhesive applying mechanism 20. The sum of the two deviation values is the total deviation value between the battery cell and the adhesive paper.

The visual compensation module compares the current position of the battery cell with its target position and compares the current position of the adhesive paper with its target position respectively to obtain a deviation value of the battery cell and a deviation value of the adhesive paper respectively. The same visual compensation module compares the current position of the battery cell with its target position and the current position of the adhesive paper with its target position sequentially, or two or more visual compensation modules can be provided for simultaneous comparison of the battery cell and the adhesive paper.

Further, an internal algorithm of the visual compensation module combines the deviation values of the two to obtain the total deviation value. Specifically, when the deviation value of the battery cell and the deviation value of the adhesive paper are in the same direction, the two deviation values are subjected to subtraction by the visual compensation module to obtain the total deviation value. When the deviation value of the battery cell and the deviation value of the adhesive paper are in opposite directions, the two deviation values are subjected to addition by the visual compensation module to obtain the total deviation value. The visual compensation module controls the adhesive applying mechanism 20 to move based on the total deviation value, so that the moving amount of the adhesive applying mechanism 20 can compensate for the total deviation value, thereby correcting the adhesive applying position of the adhesive applying mechanism 20. Finally, the adhesive applying mechanism 20 is controlled to apply adhesive at the adhesive applying position. Thus, the precision of adhesive applying can be improved effectively.

With the above structure, the detection assembly 30 can detect to obtain current positions of a battery cell and adhesive paper respectively; the visual compensation module can obtain a total deviation value based on a deviation value between the current position of the battery cell and its target position and a deviation value between the current position of the adhesive paper and its target position, and then correct an adhesive applying position of the adhesive applying mechanism 20 based on the total deviation value, so that the adhesive applying mechanism 20 can apply the adhesive on the battery cell at the corrected adhesive applying position. According to the present application, the way of correcting by means of visual compensation can effectively improve the precision of adhesive applying for the battery cell.

Figure 2:
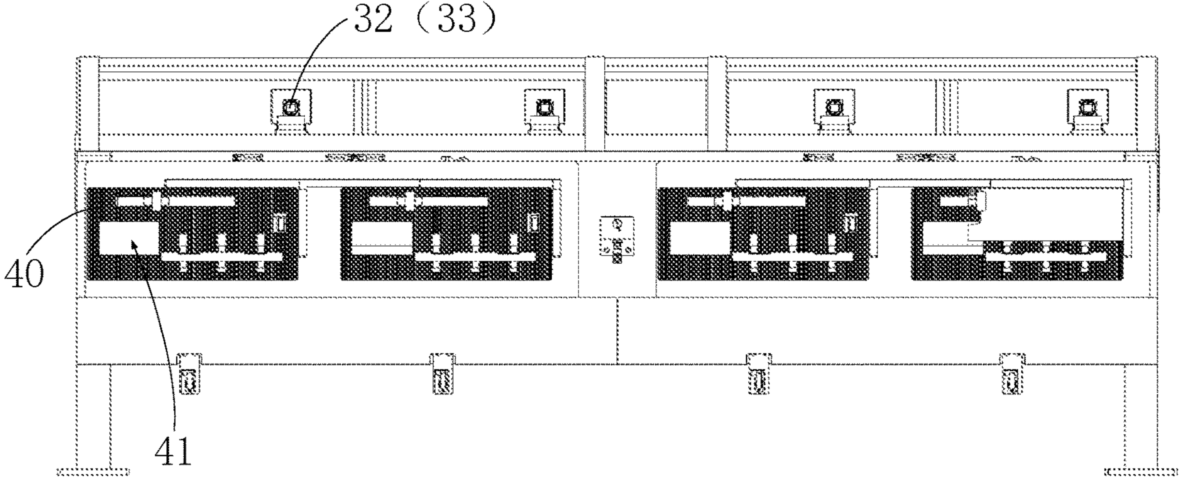
FIG. 2 is a partial schematic diagram of a positioning platform in an adhesive applying apparatus according to one or more embodiments.

As shown in FIG. 1 and FIG. 2, in some embodiments, the detection assembly 30 includes a first detection member 31 and a second detection member 32 respectively connected in communication with the visual compensation module, the first detection member 31 is configured to detect a first current position of the battery cell in the first accommodating station 11, and the second detection member 32 is configured to detect a second current position of the adhesive paper on the adhesive applying mechanism 20. The first target position is defined as a first target position of the battery cell in the first accommodating station 11 and the second target position is a second target position of the adhesive paper on the adhesive applying mechanism 20. Herein, the visual compensation module is configured to compare the first current position with the first target position to obtain a first deviation value, and is further configured to compare the second current position with the second target position to obtain a second deviation value, and to obtain the total deviation value based on the first deviation value and the second deviation value.

Specifically, the first detection member 31 may be, but is not limited to, a first positioning camera. When the battery cell is placed in the first accommodating station 11, the first detection member 31 takes a picture of the battery cell on the first accommodating station 11, to obtain a first current position of the battery cell on the first accommodating station 11. The visual compensation module acquires the first current position and compares the first current position with the preset first target position to obtain a first deviation value, which is an offset of the battery cell on the first accommodating station 11.

The second detection member 32 may be, but is not limited to, a second positioning camera. When the adhesive paper is fixed to the adhesive applying mechanism 20, the second detection member 32 takes a picture of the adhesive paper on the adhesive applying mechanism 20, to obtain a second current position of the adhesive paper on the adhesive applying mechanism 20. The visual compensation module acquires the second current position and compares the second current position with the preset second target position to obtain a second deviation value, which is an offset of the adhesive paper on the adhesive applying mechanism 20.

The visual compensation module combines the first deviation value and the second deviation value through its internal algorithm to obtain a total deviation value, which is a total offset between the battery cell and the adhesive paper. Specifically, when the first deviation value and the second deviation value have the same offset direction, the first deviation value and the second deviation value are subjected to subtraction by the visual compensation module to obtain the total deviation value. When the first deviation value and the second deviation value are opposite in offset directions, the first deviation value and the second deviation value are subjected to addition by the visual compensation module to obtain the total deviation value.

The visual compensation module controls the adhesive applying mechanism 20 to move the adhesive paper thereon based on the total deviation value, so that the adhesive applying position of the adhesive applying mechanism 20 can be corrected, thereby visually compensating for the total deviation value. Finally, the visual compensation module controls the adhesive applying mechanism 20 to apply adhesive at the corrected adhesive applying position to achieve high precision of adhesive applying.

The first detection member 31 and the second detection member 32 detect and position the battery cell and the adhesive paper respectively, so that current positions of the battery cell and the adhesive paper can be quickly obtained; and after comparison is performed by means of the visual compensation module, the total deviation value between the battery cell and the adhesive paper can be obtained quickly and accurately. Therefore, accurate visual compensation can be carried out for an adhesive applying process based on the total deviation value, thereby improving the precision of adhesive applying effectively.

In some embodiments, the adhesive applying apparatus 100 further includes a positioning platform 40 and a positioning member (not shown in the figure) arranged on the workbench 10, the positioning platform 40 has a second accommodating station 41 for accommodating the adhesive paper, and the positioning member is configured to initially position the adhesive paper in the second accommodating station 41.

Specifically, the adhesive paper is first placed on the positioning platform 40, and then initially positioned in the second accommodating station 41 on the positioning platform 40 by the positioning member. Then, the adhesive applying mechanism 20 picks the adhesive paper from the second accommodating station 41, and the second detection member 32 detects the second current position of the adhesive paper on the adhesive applying mechanism 20. The second deviation value of the adhesive paper is then obtained by comparing the second current position with the preset second target position through the visual compensation module.

Since the adhesive paper is initially positioned in the second accommodating station 41 by means of the positioning member, the second deviation value of the adhesive paper on the adhesive applying mechanism 20 can be reduced, thereby reducing the scope of visual compensation.

Furthermore, the positioning platform 40 may be, but is not limited to, a positioning plate with a positioning hole running through the positioning plate. The positioning member may be, but is not limited to, a third positioning camera, and the positioning member is arranged under the positioning platform 40 and disposed opposite the positioning hole.

When the adhesive paper is placed on the positioning platform 40, the positioning member passes through the positioning hole from bottom to top to take a picture of the adhesive paper, so as to obtain the actual position of the adhesive paper on the positioning platform 40. The adhesive paper is then moved and positioned in the second accommodating station 41, so that initial positioning of the adhesive paper is completed.

It is to be understood that the adhesive paper can be positioned in the second accommodating station 41 by other ways, for example, the positioning member is configured as a limiting member on the positioning platform 40 and encloses to form the second accommodating station 41, so that the adhesive paper is initially positioned in the second accommodating station 41 by a limiting effect of the positioning member.

The adhesive paper is initially positioned in the second accommodating station 41 by the positioning platform 40 and the positioning member, so that the position of the adhesive paper on the adhesive applying mechanism 20 is more accurate after the adhesive applying mechanism 20 picks the adhesive paper from the second accommodating station 41, thus reducing the second deviation value between the second current position of the adhesive paper and the second target position on the adhesive applying mechanism 20, and facilitating the high-precision positioning based adhesive applying between the battery cell and the adhesive paper by means of visual compensation.

Figure 3:
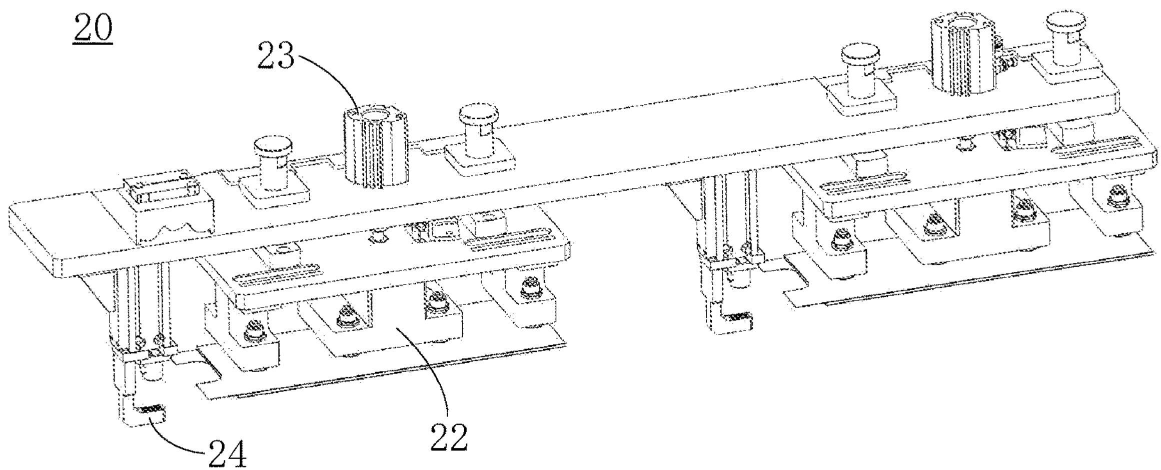
FIG. 3 is a schematic structural diagram of an adhesive applying mechanism in an adhesive applying apparatus according to one or more embodiments.

Referring to FIGS. 1, 2 and 3 together, in some embodiments, the adhesive applying mechanism 20 is movably arranged between the second accommodating station 41 and the first accommodating station 11, and the adhesive applying mechanism 20 is configured to be capable of picking the adhesive paper from the second accommodating station 41 and to apply the adhesive paper on the battery cell. In this way, the adhesive paper can be smoothly moved from the second accommodating station 41 to the first accommodating station 11 for adhesive applying.

In some embodiments, the adhesive applying mechanism 20 includes a moving member 21 and an adhesive picking member 22 arranged on the moving member 21, and the adhesive picking member 22 is configured to pick or release the adhesive paper. The moving member 21 is movably arranged on the workbench 10 and is configured to drive the adhesive picking member 22 to move between the second accommodating station 41 and the first accommodating station 11.

Specifically, the moving member 21 may be, but is not limited to, a manipulator, and the manipulator drives the adhesive picking member 22 to move so as to realize the picking and releasing of the adhesive paper.

The adhesive picking member 22 may be, but is not limited to, a suction cup, and the suction cup may suck or release the adhesive paper. First, the manipulator drives the suction cup to move to a position right above the second accommodating station 41, the suction cup sucks the adhesive paper on the second accommodating station 41, and then the second detection member 32 detects the second current position of the adhesive paper on the suction cup. The manipulator drives the suction cup and the adhesive paper to move from the second accommodating station 41 to be right above the first accommodating station 11. At the same time, the visual compensation module acquires the second current position, and obtains the second deviation value, the second deviation value is combined with the first deviation value of the battery cell to obtain the total deviation value. At this time, the visual compensation module controls the adhesive applying mechanism 20 to move based on the total deviation value, corrects the adhesive applying position of the adhesive applying mechanism 20, and finally the adhesive applying mechanism 20 applies the adhesive paper on the largest side of the battery cell at the adhesive applying position, thus realizing the high-precision adhesive applying.

It is to be noted that battery cells are usually stacked along their thickness direction, and largest sides of adjacent battery cells are adhered to each other. Accordingly, the adhesive paper is adhered on the largest sides of the battery cells, so that the battery cells can be adhered and fixed by the adhesive paper. Herein, the largest side is a surface with the largest area on the battery cell.

Further, in order to make the adhesive paper more stable to be sucked by the suction cup, a plurality of suction cups spaced apart from each other may be provided, thereby expanding the suction area of the suction cups for the adhesive paper and making the force on the adhesive paper more uniform.

With the moving member 21, the adhesive picking member 22 and the adhesive paper thereon can be smoothly driven to move between the second accommodating station 41 and the first accommodating station 11. The adhesive picking member 22 can pick or release the adhesive paper smoothly to realize smooth applying of the adhesive paper finally.

In some embodiments, the adhesive applying mechanism 20 further includes an adjusting member 23 connected between the moving member 21 and the adhesive picking member 22, and the adjusting member 23 is configured to adjust a distance between the adhesive picking member 22 and the moving member 21.

It is to be noted that in the adhesive applying process, battery cells to be applied with adhesive may have different specifications and may be different in thickness, height, and width. In the case where the battery cells of different specifications have different thicknesses, when the battery cells are placed on the first accommodating stations 11, largest sides of the battery cells to be applied with adhesive are upwards, and the battery cells are different in height.

Based on this, the adjusting member 23 is arranged between the moving member 21 and the adhesive picking member 22. When the moving member 21 drives the adhesive picking member 22 to move to a position right above the first accommodating station 11, the moving member 21 drives the adhesive picking member 22 and the adhesive paper thereon to move downwardly by a certain distance, so as to help the adhesive picking member 22 to apply the adhesive paper on the largest side of the battery cell.

At this time, the distance between the adhesive picking member 22 and the moving member 21 can be adjusted by the adjusting member 23, enabling the adhesive picking member 22 to be adapted to battery cells with different thicknesses more smoothly, so as to smoothly and stably adhere the adhesive paper on the largest sides of the battery cells.

Specifically, the adjusting member 23 may be, but is not limited to, a telescopic cylinder. Through telescopic movement of the telescopic cylinder, the adhesive picking member 22 is driven closer to or farther away from the moving member 21, so that the adhesive picking member 22 can better apply the adhesive paper on the largest side of the battery cell.

In some embodiments, the purpose of adjusting the distance between the adhesive picking member 22 and the moving member 21 can also be achieved by providing a bolt connection between the moving member 21 and the adhesive picking member 22 and adjusting the distance between the adhesive picking member 22 and the moving member 21 by rotating a bolt, or by other connection ways, which will not be repeated herein.

With the adjusting member 23, the distance between the adhesive picking member 22 and the moving member 21 can be adjusted flexibly based on different specifications of battery cells to be applied with adhesive during adhesive applying, so that the adhesive picking member 22 can stably apply the adhesive paper on the battery cells more smoothly, thereby improving stability in adhesive applying.

In some embodiments, the adhesive applying apparatus 100 further includes a feed bin 50 and a loading mechanism 60, the feed bin 50 is arranged on at least one side of the workbench 10, and the loading mechanism 60 is arranged between the feed bin 50 and the workbench 10 and configured to move the adhesive paper in the feed bin 50 to the workbench 10.

Specifically, the feed bin 50 is arranged on one side of the workbench 10 to help the loading mechanism 60 to pick the adhesive paper from the feed bin 50, and then place the adhesive paper on the positioning platform 40 and initially position the adhesive paper on the second accommodating station 41.

Further, the loading mechanism 60 may be, but is not limited to, a loading manipulator, and is provided with a suction cup. The suction cup realizes picking and releasing of the adhesive paper.

The loading manipulator drives the suction cup to move to a position right above the feed bin 50, and the suction cup descends and sucks the adhesive paper in the feed bin 50. The loading manipulator drives the suction cup to move from the position of the feed bin 50 to the positioning platform 40, so that the adhesive paper is positioned in the second accommodating station 41 on the positioning platform 40. At this time, the initial positioning of the adhesive paper is completed.

Then, the moving member 21 of the adhesive applying mechanism 20 drives the suction cup thereon to move to a position right above the second accommodating station 41 and sucks the adhesive paper. The second detection member 32 detects the second current position of the adhesive paper on the suction cup, and then the visual compensation module obtains the second deviation value of the adhesive paper based on the second current position and the second target position. The visual compensation module combines the first deviation value and the second deviation value to finally obtain the total deviation value. The adhesive applying position of the adhesive applying mechanism 20 is corrected, so that the adhesive applying mechanism 20 can carry out high-precision adhesive applying to the battery cell at the adhesive applying position.

With the arrangement of the feed bin 50 and the loading mechanism 60, it is possible to realize feeding of the adhesive paper and smoothly move the adhesive paper to the workbench 10 so as to facilitate the adhesive applying operation. Thus, the adhesive applying efficiency can be improved.

In some embodiments, the adhesive applying mechanism 20 further includes a tearing member 24, the tearing member 24 being configured to tear off release paper on the adhesive paper. Herein, the tearing member 24 is arranged on the workbench 10; or the tearing member 24 is arranged on the adhesive applying mechanism 20; or the tearing member 24 is arranged on both the workbench 10 and the adhesive applying mechanism 20.

Specifically, in the initial state, both sides of the adhesive paper are provided with release paper, so there will be two adhesive tearing operations during the entire adhesive applying process.

First, the loading mechanism 60 picks the adhesive paper from the feed bin 50 and moves it to the position of the tearing member 24. At this time, the release paper on the bottom surface of the adhesive paper is torn off by the tearing member 24, and then the adhesive paper is placed in the second accommodating station 41. Further, the moving member 21 drives the adhesive picking member 22 to pick the adhesive paper from the second accommodating station 41 and then move the adhesive paper to the adhesive applying position so as to facilitate applying the adhesive paper on the battery cell.

After the adhesive paper is adhered on the largest side of the battery cell, the release paper on a surface of a side of the adhesive paper facing away from the battery cell is torn off by the tearing member 24. Thus, when the battery cells are stacked, the adhesive paper having adhesive paper on the surface of the side facing away from the battery cell can be adhered on the largest side of an adjacent battery cell, thereby fixing the battery cells by adhesion.

Therefore, in the above process, one or more tearing members 24 may be provided according to actual needs, and the tearing member 24 may be arranged at a suitable position to tear off the release paper on the adhesive paper smoothly.

For example, a first tearing member 24 may be arranged beside the positioning platform 40. After the loading mechanism 60 picks the adhesive paper from the feed bin 50, the release paper on the bottom surface of the adhesive paper can be torn off by the first tearing member 24 before the adhesive paper is placed on the positioning platform 40. In addition, a second tearing member 24 may be arranged on the adhesive applying mechanism 20. In this way, after the adhesive paper is adhered on the largest side of the battery cell, the release paper on the surface of the side of the adhesive paper facing away from the battery cell can be torn off by the second tearing member 24 on the adhesive applying mechanism 20.

Thus, the adhesive paper can be smoothly adhered to the battery cell by means of the tearing member 24.

In some embodiments, the detection assembly 30 further includes a third detection member 33 arranged on the workbench 10, and the third detection member 33 is configured to detect the state of the release paper on the adhesive paper.

Specifically, the third detection member 33 may be, but is not limited to, a positioning camera. In addition, the third detection member 33 and the second detection member 32 may share the same positioning camera, that is, the third detection member 33 may also be a second positioning camera. After the release paper on the adhesive paper is torn off by the tearing member 24, the third detection member 33 can take a picture of the adhesive paper, so as to detect whether or not the release paper on the adhesive paper has been cleanly torn off, helping the adhesive paper to be more firmly adhered on the battery cell.

Based on the same conception as the adhesive applying apparatus 100, the present application provides a battery processing device, including an adhesive applying apparatus 100 described above, the adhesive applying apparatus 100 being configured to apply adhesive paper on the largest side of a battery cell.

Figure 4:
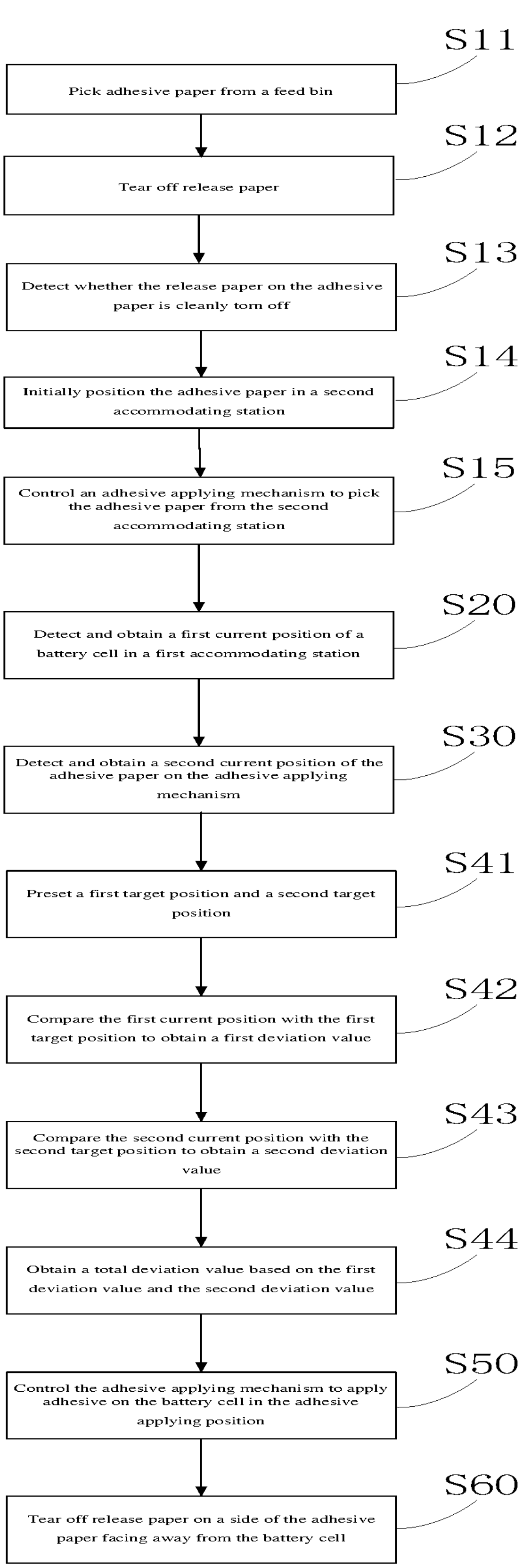
FIG. 4 is a flowchart of an adhesive applying method according to one or more embodiments.

As shown in FIG. 4, based on the same conception as the adhesive applying apparatus 100, the present application further provides an adhesive applying method including the following steps:

S20: Detect and obtain a current position of a battery cell in a first accommodating station 11 on a workbench 10.

S30: Detect and obtain a current position of adhesive paper on an adhesive applying mechanism 20.

S40: Obtain a total deviation value based on a deviation value between the current position of the battery cell and its target position and a deviation value between the current position of the adhesive paper and its target position, to correct an adhesive applying position of the adhesive applying mechanism 20.

Herein, the target positions are theoretical preset positions of the battery cell and the adhesive paper. However, in practice, there is usually a certain deviation between the actual positions of the battery cell and the adhesive paper and their target positions. Accordingly, the visual compensation module compares a current position of the battery cell with its target position, and compares a current position of the adhesive paper with its target position, so as to obtain a total deviation value. The adhesive applying position of the adhesive applying mechanism 20 is corrected based on the total deviation value.

S50: Control the adhesive applying mechanism 20 to apply adhesive on the battery cell at the adhesive applying position. The visual compensation module controls the adhesive applying mechanism 20 to move the adhesive paper thereon to the adhesive applying position based on the total deviation value, and then controls the adhesive applying mechanism 20 to apply adhesive on the battery cell at the adhesive applying position.

The visual compensation module corrects the adhesive applying position of the adhesive applying mechanism 20 based on the total deviation value, so that the adhesive applying mechanism 20 applies adhesive on the battery cell more precisely, thus realizing high-precision adhesive applying.

In some embodiments, the step S40 of obtaining a total deviation value based on a deviation value between the current position of the battery cell and its target position and a deviation value between the current position of the adhesive paper and its target position, to correct an adhesive applying position of the adhesive applying mechanism 20 further includes steps:

S41: Preset a first target position and a second target position, where the first target position is a target position of the battery cell in the first accommodating station 11 and the second target position is a target position of the adhesive paper on the adhesive applying mechanism 20. The first target position and the second target position are preset in the visual compensation module.

S42: Compare a first current position with the first target position to obtain a first deviation value.

S43: Compare a second current position with the second target position to obtain a second deviation value.

S44: Obtain the total deviation value based on the first deviation value and the second deviation value.

The visual compensation module compares the first current position with the first target position to obtain the first deviation value; Moreover, the second current position is compared with the second target position to obtain the second deviation value. The total deviation value is obtained by combining the first deviation value and the second deviation value. Based on the total deviation value, the adhesive applying mechanism 20 can be controlled to carry out visual compensation, so that the adhesive applying position of the adhesive applying mechanism 20 is corrected, realizing high-precision adhesive applying.

In some embodiments, before the step S30 of detecting and obtaining, by the detection assembly 30, a current position of adhesive paper on an adhesive applying mechanism 20, the method further includes steps:

S14: Initially position the adhesive paper in a second accommodating station 41 on a positioning platform 40. Before visual compensation carried out by means of the visual compensation module, the adhesive paper is initially positioned in the second accommodating station 41, which can reduce the second deviation value of the adhesive paper on the adhesive applying mechanism 20.

S15: Control the adhesive applying mechanism 20 to pick the adhesive paper from the second accommodating station 41. After the adhesive paper is initially positioned in the second accommodating station 41, the adhesive applying mechanism 20 is then controlled to pick the adhesive paper from the second accommodating station 41, and then the second current position of the adhesive paper is detected to obtain the second deviation value, and accordingly the precision of adhesive applying is further improved.

In some embodiments, before the step S14 of initially positioning the adhesive paper in a second accommodating station 41 on a positioning platform 40, the method further includes steps:

S11: Control a loading mechanism 60 to pick the adhesive paper from a feed bin 50.

S12: Tear off release paper on a side of the adhesive paper facing away from the loading mechanism 60.

S13: Detect whether the release paper on the adhesive paper is cleanly torn off.

In some embodiments, after the step S40 of controlling the adhesive applying mechanism 20 to apply adhesive on the battery cell at the adhesive applying position, the method further includes a step:

S60: Tear off release paper on a side of the adhesive paper facing away from the battery cell.

Through the above steps, the high-precision adhesive applying of battery cells is completed, thereby smoothening the subsequent process of stacking the battery cells to form the battery module or battery, and improving the structural precision of the battery module or battery.

It is to be noted that although the steps in the flowchart of FIG. 4 are sequentially connected to each other by arrows, these steps are not necessarily executed sequentially in the order indicated by the arrows. Unless explicitly stated herein, the execution of these steps is not strictly limited to the order, and the steps may be executed in other orders. Moreover, at least a part of the steps in FIG. 4 may include a plurality of steps or a plurality of stages, and these steps or stages are not necessarily executed and completed at the same time, but may be performed at different times. The steps or stages are not necessarily executed in sequence, but may be executed alternately or in turn with other steps or at least a part of steps or stages in other steps.

Finally, it should be noted that the above embodiments are merely used for illustrating rather than limiting the technical solutions of the present application. Although the present application has been described in detail with reference to the above various embodiments, those of ordinary skill in the art should understand that the technical solutions specified in the above various embodiments can still be modified, or some or all of the technical features therein can be equivalently substituted; and such modifications or substitutions do not make the essence of the corresponding technical solutions depart from the scope of the technical solutions of the various embodiments of the present application, which shall fall within the scope of the claims and the specification of the present application. In particular, the technical features mentioned in the various embodiments can be combined in any manner as long as there is no structural conflict. The present application is not limited to the specific embodiments disclosed herein, but rather includes all technical solutions falling within the scope of the claims.

What is claimed is:

1. An adhesive applying apparatus, comprising:

a workbench, comprising a first accommodating station for holding a battery cell;

an adhesive applying mechanism, configured to apply adhesive paper on the battery cell;

a detection assembly, arranged on the workbench and configured to detect a current position of the battery cell in the first accommodating station and a current position of the adhesive paper on the adhesive applying mechanism;

a visual compensation module, connected in communication with the adhesive applying mechanism and the detection assembly respectively, the visual compensation module being configured to obtain a total deviation value based on a deviation value between the current position of the battery cell and a target position of the battery cell, and a deviation value between the current position of the adhesive paper and a target position of the adhesive paper, to correct an adhesive applying position of the adhesive applying mechanism; and a positioning platform and a positioning member arranged on the workbench, the positioning platform having a second accommodating station for accommodating the adhesive paper, the positioning member being configured to initially position the adhesive paper in the second accommodating station, the positioning platform comprising a positioning plate with a positioning hole running through the positioning plate, the positioning member comprising a positioning camera, and the positioning member being arranged under the positioning platform and disposed opposite to the positioning hole.

2. The adhesive applying apparatus according to claim 1, wherein:

the detection assembly comprises a first detection member and a second detection member respectively connected in communication with the visual compensation module;

the first detection member is configured to detect a first current position of the battery cell in the first accommodating station, the second detection member is configured to detect a second current position of the adhesive paper on the adhesive applying mechanism;

the target position of the battery cell in the first accommodating station is defined as a first target position, and the target position of the adhesive paper on the adhesive applying mechanism is defined as a second target position; and the visual compensation module is further configured to:

compare the first current position with the first target position to obtain a first deviation value, compare the second current position with the second target position to obtain a second deviation value, and obtain the total deviation value based on the first deviation value and the second deviation value.

3. The adhesive applying apparatus according to claim 1, wherein the adhesive applying mechanism is movably arranged between the second accommodating station and the first accommodating station, and the adhesive applying mechanism is configured to be capable of picking the adhesive paper from the second accommodating station and to apply the adhesive paper on the battery cell.

4. The adhesive applying apparatus according to claim 1, wherein the adhesive applying mechanism comprises a moving member and an adhesive picking member arranged on the moving member, the adhesive picking member is configured to pick or release the adhesive paper, and the moving member is movably arranged on the workbench and configured to drive the adhesive picking member to move between the second accommodating station and the first accommodating station.

5. The adhesive applying apparatus according to claim 4, wherein the adhesive applying mechanism further comprises an adjusting member connected between the moving member and the adhesive picking member, and the adjusting member is configured to adjust a distance between the adhesive picking member and the moving member.

6. The adhesive applying apparatus according to claim 1, further comprising:

a feed bin and a loading mechanism, wherein the feed bin is arranged on at least one side of the workbench, and the loading mechanism is arranged between the feed bin and the workbench and configured to move the adhesive paper in the feed bin to the workbench.

7. The adhesive applying apparatus according to claim 1, further comprising:

a tearing member, the tearing member being configured to tear off release paper from the adhesive paper;

wherein:

the tearing member is arranged on the workbench; or the tearing member is arranged on the adhesive applying mechanism; or the tearing member is arranged on both the adhesive applying mechanism and the workbench.

8. The adhesive applying apparatus according to claim 7, wherein the detection assembly further comprises a third detection member arranged on the workbench, and the third detection member is configured to detect the state of the release paper on the adhesive paper.

9. The adhesive applying apparatus according to claim 1, wherein the adhesive applying mechanism comprises a moving member and an adhesive picking member arranged on the moving member, the adhesive picking member is configured to pick or release the adhesive paper, the moving member is movably arranged on the workbench and configured to drive the adhesive picking member to move, a bolt connection is provided between the moving member and the adhesive picking member, and the bolt connection is configured to adjust a distance between the adhesive picking member and the moving member.

10. A battery processing device, comprising the adhesive applying apparatus of claim 1, wherein the adhesive applying apparatus is configured to apply adhesive paper on a largest side of a battery cell.

11. An adhesive applying method, comprising:

detecting and obtaining a current position of a battery cell in a first accommodating station on a workbench;

initially positioning, through a positioning member on the workbench, an adhesive paper in a second accommodating station of a positioning platform on the workbench, the positioning platform comprising a positioning plate with a positioning hole running through the positioning plate, the positioning member comprising a positioning camera, and the positioning member being arranged under the positioning platform and disposed opposite to the positioning hole;

controlling an adhesive applying mechanism to pick the adhesive paper from the second accommodating station;

detecting and obtaining a current position of the adhesive paper on the adhesive applying mechanism;

obtaining a total deviation value based on a deviation value between the current position of the battery cell and a target position of the battery cell, and a deviation value between the current position of the adhesive paper and a target position of the adhesive paper, to correct an adhesive applying position of the adhesive applying mechanism; and controlling the adhesive applying mechanism to apply adhesive on the battery cell at the adhesive applying position.

12. The adhesive applying method according to claim 11, wherein obtaining the total deviation value based on the deviation value between the current position of the battery cell and the target position of the battery cell, and the deviation value between the current position of the adhesive paper and the target position of the adhesive paper, to correct the adhesive applying position of the adhesive applying mechanism comprises:

presetting a first target position and a second target position, wherein the first target position is a target position of the battery cell in the first accommodating station and the second target position is a target position of the adhesive paper on the adhesive applying mechanism;

comparing a first current position of the battery cell with the first target position to obtain a first deviation value;

comparing a second current position of the adhesive paper with the second target position to obtain a second deviation value; and obtaining the total deviation value based on the first deviation value and the second deviation value.

13. The adhesive applying method according to claim 11, further comprising, before initially positioning the adhesive paper in the second accommodating station on the positioning platform:

controlling a loading mechanism to pick the adhesive paper from a feed bin;

tearing off release paper on a side of the adhesive paper facing away from the loading mechanism; and detecting whether the release paper on the adhesive paper is cleanly torn off.

14. The adhesive applying method according to claim 13, further comprising, after controlling the adhesive applying mechanism to apply the adhesive on the battery cell at the adhesive applying position:

tearing off release paper on a side of the adhesive paper facing away from the battery cell.

* * * * *